US012523520B2

(12) United States Patent
 Kern

(10) Patent No.: US 12,523,520 B2
(45) Date of Patent: Jan. 13, 2026

(54) CONVEYOR BELT SCALES COMPRISING A METAL DETECTOR

(71) Applicant: Bizerba SE & Co. KG, Balingen (DE)

(72) Inventor: Thomas Kern, Hildesheim (DE)

(73) Assignee: BIZERBA SE & CO. KG, Balingen (DE)

( * ) Notice: Subject to any disclaimer, the term of this patent is extended or adjusted under 35 U.S.C. 154(b) by 554 days.

(21) Appl. No.: 18/080,795

(22) Filed: Dec. 14, 2022

(65) Prior Publication Data

US 2023/0194329 A1 Jun. 22, 2023

(30) Foreign Application Priority Data

Dec. 20, 2021 (EP) ..................................... 21216108

(51) Int. Cl.
 *G01G 11/00* (2006.01)
 *G01V 3/10* (2006.01)
(52) U.S. Cl.
 CPC ............. *G01G 11/003* (2013.01); *G01V 3/10* (2013.01)
(58) Field of Classification Search
 USPC .......................................................... 177/1
 See application file for complete search history.

(56) References Cited

U.S. PATENT DOCUMENTS

| | | | | |
|---|---|---|---|---|
| 3,573,784 | A * | 4/1971 | Bachofer | G01V 3/107 324/225 |
| 5,397,986 | A * | 3/1995 | Conway | G01V 3/104 324/225 |
| 6,509,533 | B1 * | 1/2003 | Tanaka | G01G 11/00 177/126 |
| 6,774,624 | B2 * | 8/2004 | Anderson | A61B 5/06 324/207.17 |
| 7,132,943 | B2 * | 11/2006 | Nelson | F41H 11/12 340/552 |
| 9,004,271 | B2 * | 4/2015 | Fourney | B65G 17/08 198/502.2 |
| 9,074,924 | B2 * | 7/2015 | Bettels | G01G 19/387 |
| 9,261,397 | B2 * | 2/2016 | Wagner | G01G 19/4144 |
| 10,768,038 | B2 * | 9/2020 | Hung | B65G 15/28 |

FOREIGN PATENT DOCUMENTS

| | | | |
|---|---|---|---|
| DE | 102020113024 A1 | 11/2021 | |
| EP | 2650660 | * 10/2013 | ............. G01G 19/03 |
| EP | 2865614 B1 | 6/2017 | |
| EP | 3578933 | * 12/2019 | ........... G01G 11/003 |
| JP | 2002156461 A | * 5/2002 | |
| RU | 2583346 C2 | 5/2016 | |

OTHER PUBLICATIONS

IEE, Analysis and Validation of a Planar High-Frequency Contactless Absolute Inductive Position Sensor, Bernhard et al. (Year: 2015).*

* cited by examiner

*Primary Examiner* — Jacques M Saint Surin
(74) *Attorney, Agent, or Firm* — LEYDIG, VOIT & MAYER, LTD.

(57) ABSTRACT

A conveyor belt scales for transporting goods includes: a feed belt; a weighing belt; and a removal belt. The weighing belt is supported on a load cell that detects a weight of the goods transported by the weighing belt. The conveyor belt scales further has a metal detector, which includes a transmitter coil and a receiver coil. The transmitter coil and the receiver coil are each a planar coil.

20 Claims, 4 Drawing Sheets

CONVEYOR BELT SCALES COMPRISING A METAL DETECTOR

CROSS REFERENCE TO RELATED APPLICATIONS

This application claims benefit to European Patent Application No. EP 21216108.7, filed on Dec. 20, 2021, which is hereby incorporated by reference herein.

FIELD

The present disclosure relates to conveyor belt scales for transporting general goods, the conveyor belt scales having a metal detector.

BACKGROUND

Metal detectors are used in the food sector for detecting metal foreign matter in foodstuffs. Metal foreign matter occurs, for example, when a part of a component breaks off in a meat processing machine and falls into the foodstuff. During operation, for instance, small screws may detach or, for example, small fragments may break off a blade. These fragments often measure just a few millimeters, for example 2 mm to 4 mm. Foodstuffs containing such foreign matter have to be detected and rejected at the end of the production process. Conveyor belt scales or price labelers for checking weights and optionally for labeling packages, for example trays containing foodstuffs, are therefore often equipped with a metal detector too. These metal detectors use X-ray technology or a tunnel that is formed by a circular coil such that the foodstuff is conveyed upright through the coil by the conveyor belt. Usually, this requires a complex design.

SUMMARY

In an embodiment, the present disclosure provides a conveyor belt scales for transporting goods that includes: a feed belt; a weighing belt; and a removal belt. The weighing belt is supported on a load cell that detects a weight of the goods transported by the weighing belt. The conveyor belt scales further has a metal detector, which includes a transmitter coil and a receiver coil. The transmitter coil and the receiver coil are each a planar coil.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
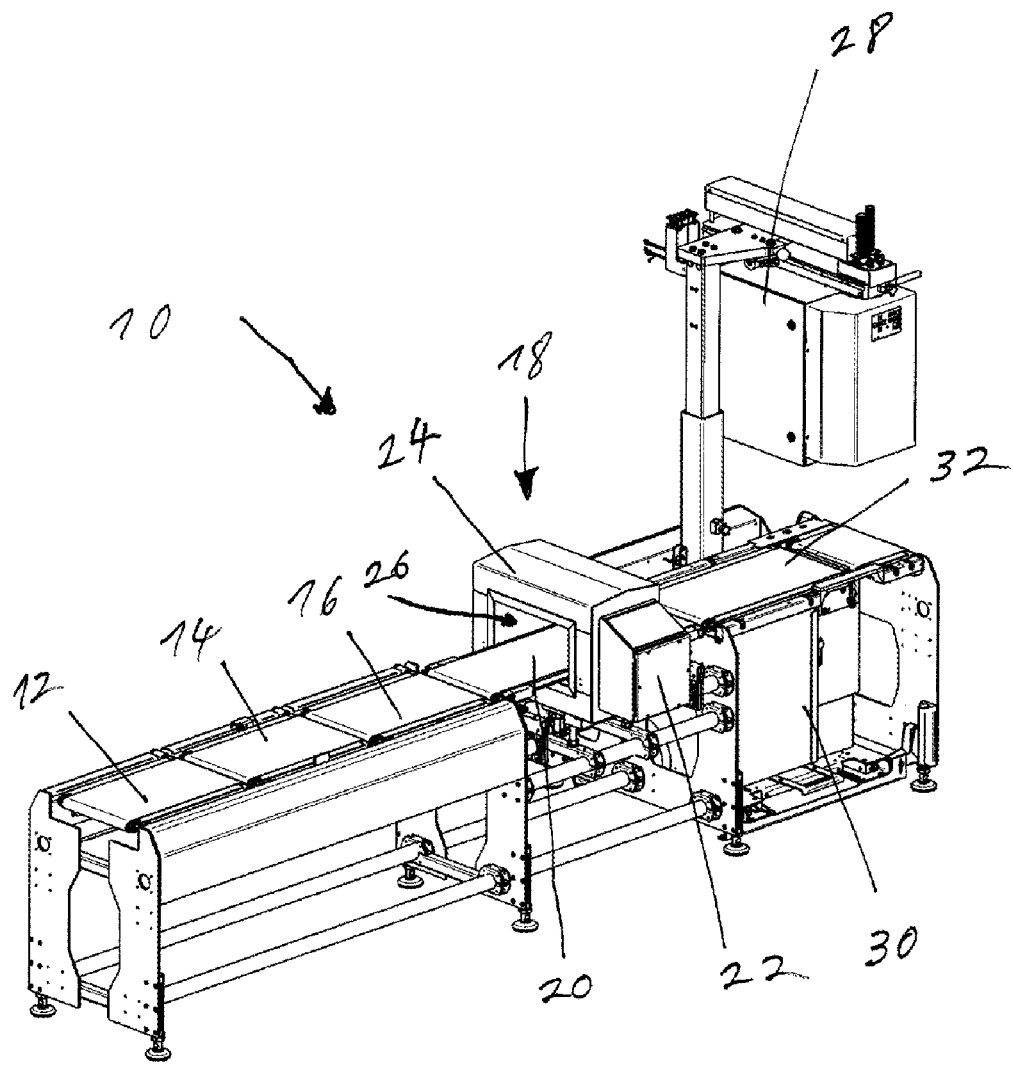
FIG. 1 shows conveyor belt scales comprising a metal detector.

In an embodiment, the present disclosure provides conveyor belt scales for general goods, in particular for foodstuffs packed in particular in trays, comprising a metal detector that is integrated in a simple manner.

According to one aspect, the present disclosure provides conveyor belt scales for transporting general goods, having a feed belt, a weighing belt, and a removal belt. The weighing belt is supported on a load cell, which detects the weight of general goods being transported by means of the weighing belt. The conveyor belt scales include a metal detector, which has at least one transmitter coil and at least one receiver coil.

According to an aspect of the present disclosure, the at least one transmitter coil and the at least one receiver coil of the metal detector may each be configured as a planar coil. In particular, a person skilled in the art construes 'planar coil' to also mean a coil having just one winding, i.e., a conductor structure configured in a circular or rectangular manner that is not closed but whose two ends extend toward each other but are separated by a small gap. In one embodiment, the planar coil is located in one plane, preferably in the plane that runs in parallel with the top side of the conveyor belt and thus in parallel with the conveyance direction. The advantage of planar coils is that they can be produced in a relatively simple, operationally reliable, inexpensive, and low-tolerance manner.

In one embodiment, at least one planar coil is configured as a conductor structure on a printed circuit board. In one embodiment, all the planar coils are configured as conductor structures on at least one printed circuit board. On a printed circuit board, the planar structures can be produced in a simple manner using a known process, and almost any number of conductor structures can be formed in one plane. The planar coil is formed in a plating layer of the printed circuit board.

In one embodiment, the conveyor belt scales comprise a conveyor belt. The conveyor belt comprises a belt body around which a conveyor belt is guided in a circulating manner by way of deflection rolls fitted at the start and at the end. At least one coil of the metal detector is integrated in the belt body between the top side and bottom side of the conveyor belt.

In one embodiment, all the coils of the metal detector are integrated in the belt body between the top side and bottom side of the conveyor belt. The advantage of this is that the general good on the top side of the conveyor belt slides over the coils of the metal detector and no further machine-mounted accessories are needed in the conveying region of the conveyor belt.

In one embodiment, one receiver coil is electrically associated with each transmitter coil. The receiver coil associated with the transmitter coil is arranged on the same printed circuit board and substantially in the same geometric region of the printed circuit board but on a different plating layer. In this regard, 'electrically associated' should be construed to mean that the receiver coil detects a magnetic reaction that is caused in a metal object by the transmitter coil. On a printed circuit board having a plurality of plating layers, the transmitter coil and receiver coil are, as it were, arranged one above the other. This is also intended to include the case whereby the transmitter coil and receiver coil are, for example, configured to be slightly displaced relative to one another but still substantially overlapping. In addition, it should be construed to mean that the transmitter coil and receiver coil are arranged so as to be twisted relative to one another.

In one embodiment, half the coils of the metal detector are integrated in the belt body between the top side and bottom side of the conveyor belt. Half the coils of the metal detector are arranged above the top side and at a distance from the top side of the conveyor belt. 'Above the top side' should be construed to mean that there is enough of a clearance between the top side of the conveyor belt and the coils so that the general good can be conveyed through beneath the coils of the metal detector but so that the coils are still arranged close enough to the conveyor belt for the magnetic field of the coils to interact with the general good.

In one embodiment, the coils arranged inside the belt body and the coils arranged above the top side of the conveyor belt are arranged at substantially the same height in the transportation direction. In other words, the coils are positioned one above the other when viewed in the transportation direction. If there are a plurality of coils, at least some of them are arranged next to one another perpendicularly to the transportation direction.

In one embodiment, a first number of two or more coils, in particular four coils, is arranged in the belt body between the top side and bottom side of the conveyor belt. The same number of coils is arranged above the top side of the belt body. Each coil in the belt body between the top side and bottom side of the conveyor belt is electrically associated with a coil above the top side of the belt body.

In one embodiment, transmitter coils and/or receiver coils consist of extended electrical conductor structures. These are arranged in particular in a circular or rectangular manner. They are arranged in particular on a printed circuit board.

In one embodiment, the conductor structures are formed substantially as a rectangular function, in particular as a regular rectangular function. The rectangular function runs along a circular path or a rectangular path.

In one embodiment, the metal detector comprises a signal generator that generates an AC signal. The AC signal is fed to the at least one transmitter coil. The AC signal fed to the at least one transmitter coil generates a magnetic field. The magnetic field induces eddy currents in a metal object that is to be detected in a general good on the conveyor belt. The general good is an object to be inspected, for example a foodstuff. By way of example, the metal object is foreign matter in the foodstuff that may pose a danger for a consumer and thus has to be detected. The metal detector comprises a signal evaluation device. The signal evaluation device detects a magnetic field generated by the eddy currents in the metal object in the general good and received by the receiver coil.

In one embodiment, the signal generator generates a pulsed AC signal. In other words, the signal generator generates an AC signal that is periodically switched on and off.

In one embodiment, the signal evaluation device does not perform any signal evaluation at the time when the pulsed AC signal from the signal generator is greater than zero. This should be construed to mean that no signal evaluation is performed when the transmitter coil is generating a magnetic field. This magnetic field of the transmitter coil would interfere with the signal evaluation by the signal evaluation device. In this respect, a person skilled in the art understands that the signal from the signal generator is greater than zero when the signal from the signal generator is switched on and is exactly zero when the signal from the signal generator is switched off. Since the practical implementation in the case of a pulsed signal means that infinitely steep flanks are not possible, a person skilled in the art understands that zero is to be construed as a threshold value in the region of a very low signal strength.

In one embodiment, the transmitter coils and the receiver coils are electrically shielded from one another.

In one embodiment, the conveyor belt scales comprise a photoelectric sensor or a distance sensor for detecting a package in the detection range of the metal detector. The conveyor belt scales comprise a controller that places the metal detector in an active state when the photoelectric sensor or distance sensor detects, within the range of the metal detector, a general good being conveyed on the conveyor belt scales.

FIG. 1 shows conveyor belt scales 10 consisting of a feed belt 12, a weighing belt 14, which is supported on a load cell, and a removal belt 16. Downstream of the removal belt 16 there is a metal detector 18, which comprises a conveyor belt 20 that receives general goods from the removal belt and transports them downstream. In this case, the metal detector 18 comprises a housing 24 in which a coil assembly is located. The housing 24 has a through-opening 26 for general goods and for the conveyor belt 20. The general good is transported on the conveyor belt 20 in the conveyance direction through the through-opening 26 in the housing 24. The coil assembly consists of coils arranged one behind the other in the conveyance direction, namely a first receiver coil, followed by a transmitter coil, followed by a second receiver coil. All the coils are arranged in parallel with one another and consist of circular windings attached inside the housing 24. The coils are formed in a plane perpendicularly to the conveyance direction. Each coil wraps around the through-opening 26. In this case, the coils comprise a multiplicity of windings made of a metal wire. The metal detector comprises a controller 22 in which the signals for the transmitter coil are generated and the signals from the receiver coils are processed. Downstream of the metal detector 18, a printer station is attached, which in turn comprises a conveyor belt 32 and comprises a top labeler 28 for labeling general goods from above and a bottom labeler 30 for labeling general goods from below.

Figure 2:
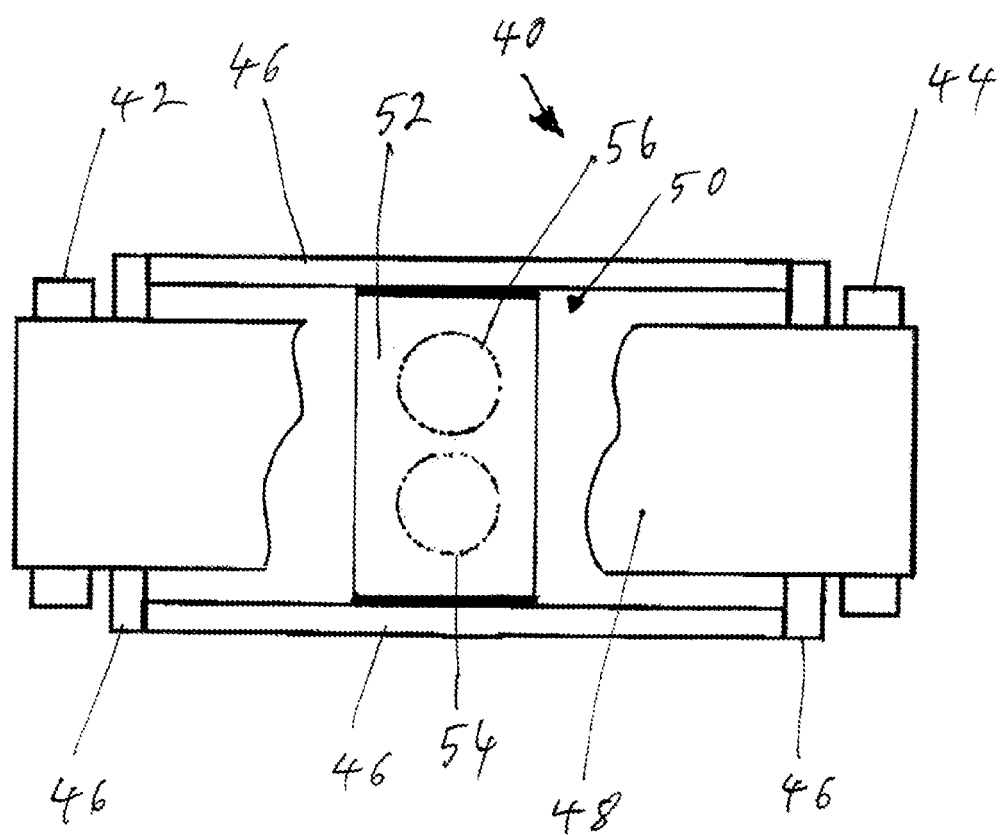
FIG. 2 shows a conveyor belt comprising an integrated metal detector according to a first embodiment.

FIG. 2 shows a conveyor belt 40 comprising an integrated metal detector according to a first embodiment of the present disclosure. In this case, the conveyor belt consists of a belt body, which consists of a frame 46. Deflection rolls 42, 44 are attached at both longitudinal ends of the frame 46, i.e., at the start and end of the frame 46, and a conveyor belt 48 is guided around the deflection rolls in a circulating manner.

In FIG. 2, the conveyor belt 48 is discontinuous to illustrate the region 50 inside the frame 46. In reality, however, the conveyor belt 48 is closed and can thus be guided in a continuously circulating manner around the deflection rolls 42, 44, one of which is driven. General goods are transported in the transportation direction on the conveyor belt 48.

In the region 50 inside the frame 46, a printed circuit board 52, which in this case comprises two coils 54, 56, is attached transversely to the transportation direction of the conveyor belt 40. The number of the coils 54, 56 is dependent on the size thereof and on the width of the conveyor belt 48. The number of coils 54, 56, in particular arranged on a straight line transversely to the transportation direction, is such that the electromagnetic fields of the coils 54, 56 fully cover the region over the entire width of the conveyor belt 48 so that the general good being transported on the conveyor belt 48 is screened in its entirety. The coils 54, 56 are electrically connected to the controller 22. The transmit signal of each coil 54, 56 is generated in the controller 22. The receive signals of each coil 54, 56 are evaluated in the controller 22.

The controller 22 comprises a signal generator, which generates an AC signal that is fed to the at least one transmitter coil 54, 56. The AC signal fed to the at least one transmitter coil 54, 56 generates a magnetic field that induces eddy currents in a metal object that is to be detected in a general good on the conveyor belt 48. The controller 22 comprises a signal evaluation device, which detects and evaluates a magnetic field generated by the eddy currents in the metal object in the general good and received by the receiver coil 54, 56.

Attached to the frame 46 is a plate, in particular a metal plate, on which the conveyor belt 48 slides and by which the conveyor belt 48 is supported. If this plate consists of a material that does not interfere with the electromagnetic field of the coils, the plate can also be attached continuously over the printed circuit board 52. If the plate consists of a material that does interfere with the electromagnetic field of the coils, in particular of metal, the plate has to be discontinuous in the region of the coils.

The metal detector integrated in the conveyor belt 40 comprises just one printed circuit board 52 below the top side of the conveyor belt 48 in the region 50 inside the frame 46.

Figure 3A:
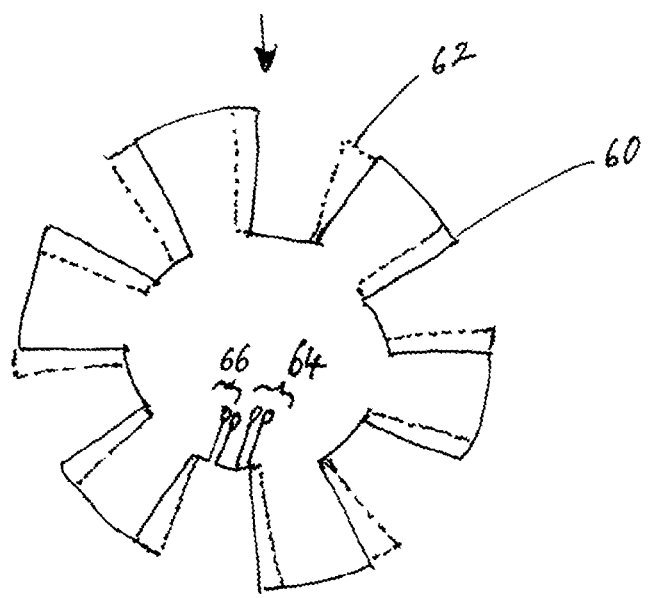
FIG. 3a shows a conductor structure of a coil according to a first embodiment.
Figure 3B:
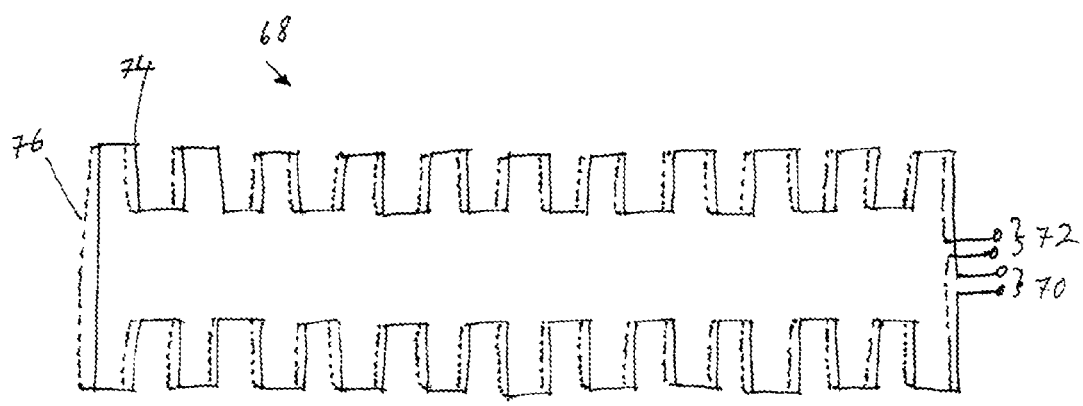
FIG. 3b shows a conductor structure of a coil according to a second embodiment.

As shown in FIGS. 3a and 3b in a first and second embodiment, transmitter coils and receiver coils are configured as conductor structures on the printed circuit board 52.

FIG. 3a shows a conductor structure of a coil 54, 56 that serves as both a transmitter coil 62 and a receiver coil 60. In this case, two similar conductor structures that have the same or a similar outline are electrically insulated from one another. These conductor structures are electrically insulated from one another by being arranged on different plating layers on a printed circuit board 52 having a plurality of plating layers.

In FIG. 3a the conductor structure 60 marked by the solid line shows the uppermost plating layer. This is the receiver coil 60. The conductor structure 62 marked by the dashed line shows a conductor structure on a plating layer therebelow. This is the transmitter coil 62. In principle, the transmitter coil and receiver coil can also be swapped around. However, it has been found that the signal caused by small pieces of metal in the general good is too low and hard to detect. For this reason, it is advantageous to attach the receiver coil 60 to the uppermost plating layer of the printed circuit board 52 in order to increase the sensitivity.

The receiver coil 60 is connected to the controller 22 by means of an electrical terminal 66. The transmitter coil 62 is connected to the controller 22 by means of an electrical terminal 64. The conductor structures 60, 62 of the transmitter coil 62 and receiver coil 60 follow a periodic, i.e., regular, rectangular function. This rectangular function is arranged on a circular path. The conductor structures 60, 62 are thus star-shaped, with the points being flat. In this case, the transmitter coil 62 and receiver coil 60 are arranged directly one above the other, i.e., so as to geometrically overlap, or are slightly twisted and/or displaced relative to one another. In one embodiment, the transmitter coil 62 and receiver coil 60 might be of slightly different sizes.

FIG. 3b shows a conductor structure of a coil 68 that serves as both a transmitter coil 76 and a receiver coil 74. The arrangement on a printed circuit board 52 on different plating layers is basically the same as the embodiment in FIG. 3a. The conductor structures of the transmitter coil 76 and receiver coil 74 are likewise configured as a periodic rectangular function. Unlike FIG. 3a, however, they extend along a rectangle. For instance, a transmitter coil 76 and a receiver coil 74 may take up a large part of the extent of the printed circuit board 52 below the conveyor belt 48 and thus generate an electromagnetic field over the entire width of the conveyor belt 48. The transmitter coil 76 is connected to the controller 22 by means of an electrical terminal 72. The receiver coil 74 is connected to the controller 22 by means of an electrical terminal 70.

Figure 4:
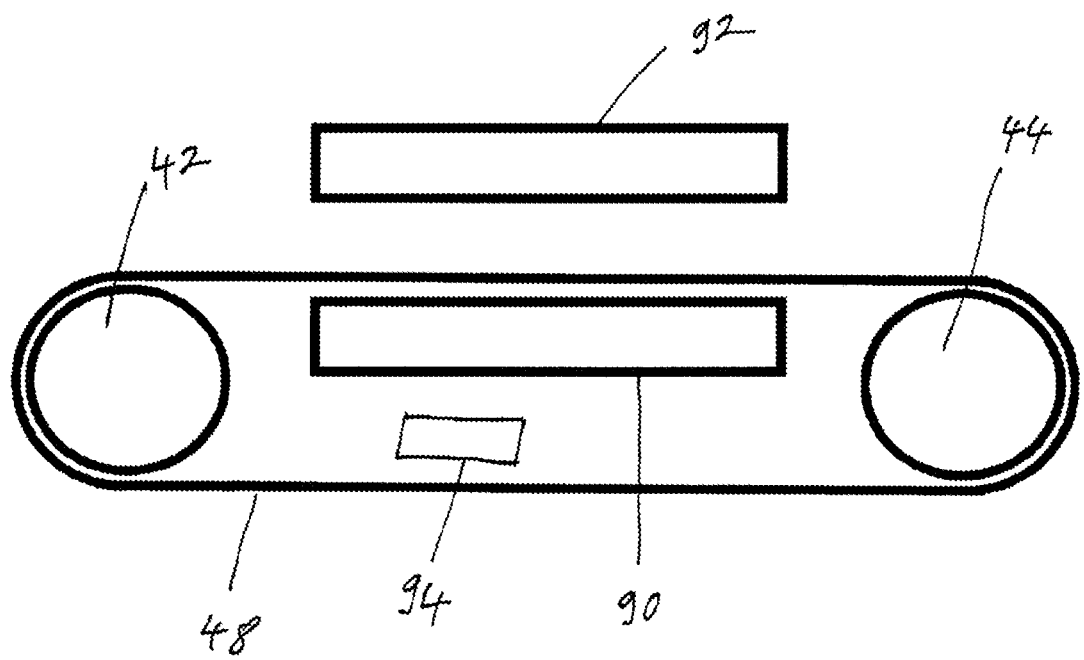
FIG. 4 shows a conveyor belt comprising an integrated metal detector according to a second embodiment.

FIG. 4 shows a conveyor belt comprising an integrated metal detector according to a second embodiment of the present disclosure. In this case, the conveyor belt comprises a first printed circuit board 90 inside the frame of the belt body of the conveyor belt. In addition, the metal detector comprises a second printed circuit board 92 above the top side of the conveyor belt 48. The general good conveyed on the conveyor belt 48 is conveyed through in the region between the first printed circuit board 90 and the second printed circuit board 92 while the conveyor belt 48 is guided around input-side and output-side deflection rolls 42, 44 in a circulating manner. A controller 94 is electrically connected to the printed circuit boards 90, 92.

Figure 5:
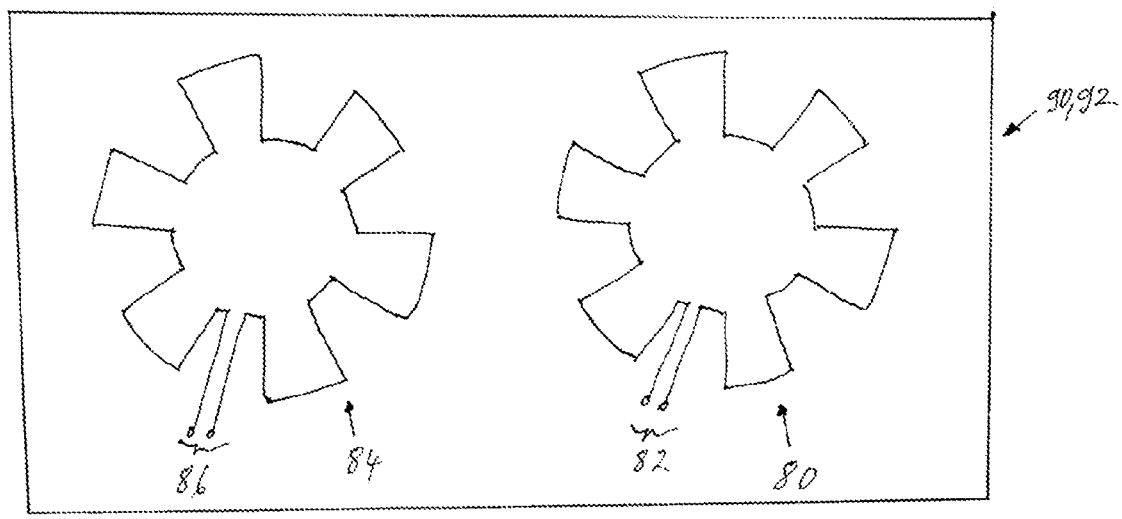
FIG. 5 shows a conductor structure of a coil according to a third embodiment.

FIG. 5 shows a printed circuit board 90, 92 of the metal detector of the second embodiment. Once again, the coils 80, 84 are formed as a regular, i.e., periodic, rectangular function that runs along a circular path, as shown in FIG. 5. Alternatively, the conductor structure of the coils 80, 84 may also run along a rectangle or oval. The coils 80, 84 are connected to the controller 94 by the terminals 82, 86 and are electrically controlled. In this case, the conductor structures on the first printed circuit board 90 and the associated conductor structures on the second printed circuit board 92 (transmitter coils and receiver coils) are arranged geometrically one above the other in the conveyance direction such that they interact. In this case, a coil 80, 84 on the first printed circuit board 90 and a coil 80, 84 on the second printed circuit board 92 are used as the associated transmitter coil and receiver coil. In this case, in one embodiment, all the transmitter coils can be arranged on the first printed circuit board 90 and all the receiver coils can be arranged on the second printed circuit board 92. In one embodiment, all the transmitter coils can be arranged on the second printed circuit board 92 and all the receiver coils can be arranged on the first printed circuit board 90. In addition, transmitter coils and receiver coils can each be alternately arranged on the first printed circuit board 90, and the associated receiver coils and transmitter coils are then each arranged on the second printed circuit board 92 and thus also alternately thereon.

A printed circuit board shown in FIG. 5 comprising conductor structures in just one plating layer can also be used as a printed circuit board 52 in the first embodiment example according to FIG. 2. In this case, the conductor structures 80, 84 are used as transmitter coils and receiver coils. The transmit signal is generated by means of the signal generator the controller 22 and is applied to the coils 80, 84 in a pulsed manner, or the signal generator generates a pulsed AC signal. Once the transmit signal has been applied to the coils 80, 84, the signal is switched off and the signal received by the coils is evaluated. The two coils 80, 84 are thus used as the transmitter coil and the receiver coil in a staggered manner. In this embodiment example, the transmit signal and the receive signal are decoupled not by electrically decoupling the coils, but rather by way of the staggering.

The conveyor belts comprising an integrated metal detector according to the embodiments as per FIG. 2 or FIG. 4 can be arranged at the position of the feed belt 12, the removal belt 16, or the separate metal detector belt 20 and can replace the belt in question.

The functions of various elements shown in the drawings, including the functional blocks, may be implemented by dedicated hardware or by generic hardware capable of executing software, in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and non-volatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A conveyor belt scales for transporting goods, the conveyor belt scales comprising:
    a feed belt;
    a weighing belt; and
    a removal belt,
    wherein the weighing belt is supported on a load cell that is configured to detect a weight of the goods being transported by the weighing belt,
    wherein the conveyor belt scales further comprise a metal detector that comprises at least one transmitter coil and at least one receiver coil,
    wherein the at least one transmitter coil and the at least one receiver coil are each configured as a planar coil,
    wherein the metal detector further comprises a signal generator that is configured to generate an AC signal that is fed to the at least one transmitter coil,
    wherein the AC signal fed to the at least one transmitter coil is configured to generate a magnetic field that induces eddy currents in a metal object that is to be detected in a good on the conveyor belt, and
    wherein the metal detector further comprises a signal evaluator that is configured to detect a magnetic field generated by the eddy currents in the metal object in the good and received by the receiver coil.

2. The conveyor belt scales for transporting the goods according to claim 1, wherein at least one of the planar coils are configured as conductor structures on at least one printed circuit board.

3. The conveyor belt scales for transporting the goods according to claim 1, wherein the conveyor belt scales further comprise a conveyor belt that comprises a belt body around which the conveyor belt is guided in a circulating manner by deflection rolls fitted at a start and at an end, and
    wherein at least one of the at least one transmitter coil or the at least one receiver coil of the metal detector is integrated in the belt body between a top side and a bottom side of the conveyor belt.

4. The conveyor belt scales for transporting the goods according to claim 3, wherein each of the at least one transmitter coil and the at least one receiver coil of the metal detector are integrated in the belt body between the top side and bottom side of the conveyor belt.

5. The conveyor belt scales for transporting the goods according to claim 4, wherein one receiver coil, of the at least one receiver coil, is electrically associated with each of the at least one transmitter coil, and the one receiver coil associated with each of the at least one transmitter coil is arranged on a same printed circuit board and substantially in a same geometric region of the printed circuit board but on a different plating layer.

6. The conveyor belt scales for transporting the goods according to claim 3,
    wherein the at least one transmitter coil and the at least one receiver coil are coils of the metal detector, and
    wherein half of the coils of the metal detector are integrated in the belt body between the top side and the bottom side of the conveyor belt and another half the coils of the metal detector are arranged above the top side and at a distance from the top side of the conveyor belt.

7. The conveyor belt scales for transporting the goods according to claim 6, wherein the coils arranged inside the belt body and the coils arranged above the top side of the conveyor belt are arranged at substantially a same height in the transportation direction.

8. The conveyor belt scales for transporting the goods according to claim 7, wherein a first number of two or more of the coils are arranged in the belt body between the top side and the bottom side of the conveyor belt, and a second number of coils, which is the same as the first number, are arranged above the top side of the belt body, each of the coils in the belt body between the top side and bottom side of the conveyor belt being electrically associated with one of the coils above the top side of the belt body.

9. The conveyor belt scales for transporting general goods according to claim 8, wherein four of the coils are arranged in the belt body between the top side and the bottom side of the conveyor belt, and another four coils are arranged above the top side of the belt body.

10. The conveyor belt scales for transporting the goods according to claim 2, wherein all of the planar coils are configured as conductor structures on the at least one printed circuit board.

11. The conveyor belt scales for transporting the goods according to claim 1, wherein the at least one transmitter coil or the at least one receiver coil consist of extended electrical conductor structures that are arranged in a circular or rectangular manner on a printed circuit board.

12. The conveyor belt scales for transporting the goods according to claim 11, wherein the electrical conductor structures are formed substantially as a regular rectangular function, and the regular rectangular function runs along a circular path or a rectangular path.

13. The conveyor belt scales for transporting the goods according to claim 1, wherein the signal generator is configured to generate a pulsed AC signal.

14. The conveyor belt scales for transporting the goods according to claim 13, wherein the signal evaluator is configured not to perform any signal evaluation at a time when the pulsed AC signal from the signal generator is greater than zero.

15. The conveyor belt scales for transporting the goods according to claim 1, wherein the at least one transmitter coil and the at least one receiver coil are electrically shielded from one another.

16. The conveyor belt scales for transporting the goods according to claim 1,
wherein the conveyor belt scales further comprise a photoelectric sensor or a distance sensor configured to detect a package in a detection range of the metal detector, and
wherein the conveyor belt scales further comprise a controller that is configured to place the metal detector in an active state upon the photoelectric sensor or the distance sensor detects, within the detection range of the metal detector, a good being conveyed on the conveyor belt scales.

17. A conveyor belt scales for transporting goods, the conveyor belt scales comprising:
a feed belt;
a weighing belt; and
a removal belt,
wherein the weighing belt is supported on a load cell that is configured to detect a weight of the goods being transported by the weighing belt,
wherein the conveyor belt scales further comprise a metal detector that comprises at least one transmitter coil and at least one receiver coil,
wherein the at least one transmitter coil and the at least one receiver coil are each configured as a planar coil,
wherein the conveyor belt scales further comprise a conveyor belt that comprises a belt body around which the conveyor belt is guided in a circulating manner by deflection rolls fitted at a start and at an end,
wherein at least one of the at least one transmitter coil or the at least one receiver coil of the metal detector is integrated in the belt body between a top side and a bottom side of the conveyor belt,
wherein the at least one transmitter coil and the at least one receiver coil are coils of the metal detector, and
wherein half of the coils of the metal detector are integrated in the belt body between the top side and the bottom side of the conveyor belt and another half the coils of the metal detector are arranged above the top side and at a distance from the top side of the conveyor belt.

18. The conveyor belt scales for transporting the goods according to claim 17, wherein the coils arranged inside the belt body and the coils arranged above the top side of the conveyor belt are arranged at substantially a same height in the transportation direction.

19. The conveyor belt scales for transporting the goods according to claim 18, wherein a first number of two or more of the coils are arranged in the belt body between the top side and the bottom side of the conveyor belt, and a second number of coils, which is the same as the first number, are arranged above the top side of the belt body, each of the coils in the belt body between the top side and bottom side of the conveyor belt being electrically associated with one of the coils above the top side of the belt body.

20. A conveyor belt scales for transporting goods, the conveyor belt scales comprising:
a feed belt;
a weighing belt; and
a removal belt,
wherein the weighing belt is supported on a load cell that is configured to detect a weight of the goods being transported by the weighing belt,
wherein the conveyor belt scales further comprise a metal detector that comprises at least one transmitter coil and at least one receiver coil,
wherein the at least one transmitter coil and the at least one receiver coil are each configured as a planar coil, and
wherein the at least one transmitter coil and the at least one receiver coil are electrically shielded from one another.

* * * * *